(12) United States Patent
Hunt

(10) Patent No.: US 12,538,865 B2
(45) Date of Patent: Feb. 3, 2026

(54) CALIBRATION OF HARVESTING HEAD HAVING A GROUND FORCE SENSING SYSTEM

(71) Applicant: CNH Industrial America LLC, New Holland, PA (US)

(72) Inventor: Cory Hunt, Millersville, PA (US)

(73) Assignee: CNH INDUSTRIAL AMERICA, LLC., New Holland, PA (US)

(*) Notice: Subject to any disclaimer, the term of this patent is extended or adjusted under 35 U.S.C. 154(b) by 442 days.

(21) Appl. No.: 18/205,753

(22) Filed: Jun. 5, 2023

(65) Prior Publication Data

US 2023/0389469 A1    Dec. 7, 2023

Related U.S. Application Data

(60) Provisional application No. 63/348,540, filed on Jun. 3, 2022.

(51) Int. Cl.
| | |
|---|---|
| *A01D 34/28* | (2006.01) |
| *A01D 34/00* | (2006.01) |
| *A01D 34/04* | (2006.01) |
| *A01D 34/24* | (2006.01) |

(52) U.S. Cl.
CPC ......... *A01D 34/283* (2013.01); *A01D 34/006* (2013.01); *A01D 34/246* (2013.01); *A01D 34/04* (2013.01)

(58) Field of Classification Search
CPC .. A01D 34/283; A01D 34/006; A01D 34/246; A01D 34/04

USPC .......................................................... 701/50
See application file for complete search history.

(56) References Cited

U.S. PATENT DOCUMENTS

| | | | |
|---|---|---|---|
| 3,383,845 A | 5/1968 | Hirsch et al. | |
| 5,309,700 A | 5/1994 | Winkels et al. | |
| 5,359,836 A * | 11/1994 | Zeuner ................. | A01D 41/141 56/208 |
| 5,524,424 A * | 6/1996 | Halgrimson ......... | A01D 41/127 701/1 |
| 5,535,577 A | 7/1996 | Chmielewski et al. | |
| 5,613,352 A * | 3/1997 | Panoushek .......... | A01D 41/141 56/DIG. 15 |

(Continued)

FOREIGN PATENT DOCUMENTS

DE    2830794 A1    2/1979

*Primary Examiner* — Luis A Martinez Borrero
(74) *Attorney, Agent, or Firm* — Selene Haedi; Rickard DeMille; Rebecca Henkel

(57) ABSTRACT

A method for dynamically operating a header float system of an agricultural vehicle having a header movably mounted to a frame by an actuator and a flotation adjustment system that relies on ground-contact force measurement. The method includes: determining an initial zero value load sensor output signal representative of an initial position of the header raised out of contact with the ground surface, calibrating the sensor with the initial zero value, operating the header to process a crop material, detecting a subsequent position of the header out of contact with the ground surface, determining a subsequent zero value representative of the subsequent position of the header, and re-calibrating the sensor with the subsequent zero value. Also, an agricultural vehicle having a header operated as described above.

19 Claims, 7 Drawing Sheets

(56) References Cited

U.S. PATENT DOCUMENTS

| | | | | |
|---|---|---|---|---|
| 5,704,200 | A * | 1/1998 | Chmielewski, Jr. | A01D 41/141 56/DIG. 15 |
| 7,168,226 | B2 * | 1/2007 | McLean | A01D 41/141 56/10.2 E |
| 7,310,931 | B2 | 12/2007 | Gramm | |
| 7,430,846 | B2 * | 10/2008 | Bomleny | A01D 41/141 56/10.2 E |
| 7,603,837 | B2 * | 10/2009 | Ehrhart | A01D 34/283 56/208 |
| 7,661,251 | B1 * | 2/2010 | Sloan | A01D 41/145 60/413 |
| 7,707,811 | B1 * | 5/2010 | Strosser | A01D 41/141 56/10.2 E |
| 7,975,458 | B1 * | 7/2011 | Noll | A01D 41/141 56/10.2 E |
| 8,051,632 | B2 * | 11/2011 | Strosser | A01D 41/141 701/50 |
| 8,863,484 | B2 * | 10/2014 | Patterson | A01D 41/145 56/10.2 R |
| 8,966,871 | B2 * | 3/2015 | Nafziger | A01D 43/107 56/10.2 A |
| 9,781,880 | B2 * | 10/2017 | Cleodolphi | A01D 41/145 |
| 9,968,033 | B2 * | 5/2018 | Dunn | A01B 63/008 |
| 10,028,435 | B2 * | 7/2018 | Anderson | A01D 41/1271 |
| 10,531,607 | B2 | 1/2020 | Schroeder et al. | |
| 10,568,264 | B2 * | 2/2020 | Fay, II | A01D 41/141 |
| 10,624,263 | B2 * | 4/2020 | Dunn | A01D 41/141 |
| 10,701,862 | B2 * | 7/2020 | Thomson | A01D 34/006 |
| 10,820,468 | B2 * | 11/2020 | Henry | A01B 63/14 |
| 11,032,970 | B2 * | 6/2021 | Brimeyer | A01D 41/141 |
| 11,382,268 | B2 * | 7/2022 | Hunt | A01D 41/1271 |
| 11,412,661 | B2 * | 8/2022 | Hunt | A01D 41/144 |
| 11,432,462 | B2 * | 9/2022 | Garbald | A01B 63/108 |
| 11,589,511 | B2 * | 2/2023 | Byttebier | A01D 41/141 |
| 12,369,512 | B2 * | 7/2025 | DeChristopher | A01D 75/002 |
| 2007/0068129 | A1 * | 3/2007 | Strosser | A01D 41/141 56/10.2 E |
| 2007/0204582 | A1 * | 9/2007 | Coers | A01D 41/141 56/10.2 E |
| 2007/0214760 | A1 * | 9/2007 | Bomleny | A01D 41/145 56/10.2 E |
| 2009/0069988 | A1 * | 3/2009 | Strosser | A01D 41/141 73/1.01 |
| 2015/0195991 | A1 * | 7/2015 | Ricketts | A01D 34/03 56/249 |
| 2017/0251600 | A1 * | 9/2017 | Anderson | A01D 41/1272 |
| 2018/0070531 | A1 * | 3/2018 | Long | A01D 34/006 |
| 2020/0390035 | A1 * | 12/2020 | Hunt | A01D 41/144 |
| 2022/0053693 | A1 * | 2/2022 | Gahres | A01D 41/145 |
| 2022/0264798 | A1 * | 8/2022 | Martin | A01D 41/141 |
| 2023/0172106 | A1 * | 6/2023 | Turcato | A01D 41/127 701/50 |
| 2023/0309441 | A1 * | 10/2023 | Thomas | G01L 1/2206 56/10.2 A |
| 2025/0048964 | A1 * | 2/2025 | Farley | A01D 41/127 |

* cited by examiner

CALIBRATION OF HARVESTING HEAD HAVING A GROUND FORCE SENSING SYSTEM

BACKGROUND OF THE INVENTION

Various types of agricultural vehicles use headers to process crop materials. For example, windrowers (also known as swathers) are used to cut crop material and form it into windrows (a cut row or material) that is later processed, typically after drying, by other equipment. Similarly, combine harvesters use headers to process crop materials, which are conveyed into a crop processing system located on the chassis of the vehicle. In either case, it is often desirable to movably mount the header to the chassis of the vehicle to allow height adjustment and/or tilt adjustment. It is also often desirable to mount the header such that it can move to follow or "float" over undulating terrain. Similar capability is often desirable in multi-segment headers to allow an articulated portion of the header to adjust or float relative to an adjacent part of the header.

A typical self-propelled windrower has a header that is movably mounted to the vehicle chassis by hydraulic actuators. The hydraulic actuators comprise piston and cylinder assemblies that use hydraulic fluid to move the piston relative to the cylinder. The position of the header is controlled by changing the volume of fluid in the cylinder. Float is provided by including an accumulator in the hydraulic circuit. A typical accumulator is a reservoir that is fluidly connected to the hydraulic circuit, and contains a volume of pressurized gas. In use, as the header moves over undulating terrain, the gas can expand and contract to provide a spring-like resilience to the hydraulic circuit. Thus, the header is effectively suspended on an air spring.

It will be appreciated from the foregoing that the gas pressure dictates the spring force, and therefore controls the amount of force required to allow the header to float. The spring force can be adjusted by varying the state of a pressure reducing valve connected to the accumulator. For example, in one known system, a pressure reducing valve ("PRV") is used to control the pressure. This device operates by using an electric current to set the PRV operating state. The operator can adjust the current to the PRV using a toggle switch or other controls. Such systems are functional, but can suffer from various problems that cause the actual floatation force to vary significantly for a given current setting. For example, variations in hydraulic oil temperature, hysteresis in the PRV, and changes in operating friction throughout the system, can all change the actual floatation force provided by the accumulator without any change to the input current to the PRV. Similar problems occur when the header changes weight during operation. This can happen by accumulating crop material and soil to increase in weight. Similarly, the weight of the header can reduce after initial calibration if crop material or soil on the header during calibration fall off or dry out during operation. Thus, an experienced operator must occasionally adjust the signal to the PRV to maintain the desired floatation force.

An example of a system for controlling the header position using pressurized hydraulic fluid is provided in U.S. Pat. No. 5,633,452, which is incorporated herein by reference. In this example, the header height is established by setting a pressure in hydraulic header lift cylinders, and float is provided by providing an accumulator in the hydraulic circuit. A pressure sensor is used to determine if the hydraulic pressure in the circuit drops below a minimum safe value, and automatically raises the pressure when this happens. This system relies on sensing the hydraulic pressure of the hydraulic circuit, which can lead to problems. For example, friction in the hydraulic cylinders (so-called "stiction"), as well as at other locations such as pivots, can cause force reactions that make the hydraulic pressure of the fluid inaccurate as a measure of the actual header height setting. For example, during efforts to lift the header, a sticking hydraulic cylinder can generate high hydraulic pressure, without a corresponding increase in header height. U.S. Pat. No. 7,168,226, U.S. Publication No. 2006/0254239, U.S. Publication No. 2022/0053693, and PCT Publication No. WO 2022/046769 also show systems for controlling a header, and these references are incorporated herein by reference.

The inventors have determined that the state of the art of header floatation systems can still be improved.

This description of the background is provided to assist with an understanding of the following explanations of exemplary embodiments, and is not an admission that any or all of this background information is necessarily prior art.

SUMMARY OF THE INVENTION

In one exemplary aspect, there is provided a method for dynamically operating a header float system of an agricultural vehicle having a header movably mounted to a frame by an actuator and a flotation adjustment system that relies on ground-contact force measurement. The method includes initially raising the header or a portion thereof to a position out of contact with the ground surface and detecting a status of a load sensor, the load sensor configured to generate an output signal representative of a ground force sensed by the load sensor. The method further includes determining an initial zero value sensor output signal representative of the position of the header or the portion thereof initially raised out of contact with the ground surface, calibrating the load sensor with the initial zero value sensor output signal, operating the header at a working height to process a crop material, detecting a subsequent position of the header or the portion thereof out of contact with the ground surface, determining a subsequent zero value sensor output signal representative of the subsequent position of the header or the portion thereof raised out of contact with the ground surface, and re-calibrating the load sensor with the subsequent zero value sensor output signal.

In some exemplary aspects, the method includes comparing the initial zero value sensor output signal to the subsequent zero value sensor output signal, and, upon determining that the subsequent zero value sensor signal differs from the initial zero value sensor signal by a predetermined amount, re-calibrating the load sensor with the subsequent zero value sensor output signal.

In some exemplary aspects, the method includes re-calibrating the load sensor with the subsequent zero value sensor output signal automatically upon determining the subsequent zero value sensor output signal.

In some exemplary aspects, in determining the initial zero value sensor output signal representative of the position of the header or the portion thereof initially raised out of contact with the ground surface, the header is raised above a maximum working height, and the header is subsequently operated at or below the maximum working height.

In some exemplary aspects, the method further includes determining a target ground reaction force between the header and a ground surface located below the header, determining an actual ground reaction force between the header and the ground surface, comparing the actual ground reaction force to the target ground reaction force, and, upon determining that the actual ground reaction force differs from the target ground reaction force by a predetermined amount, operating the actuator to reduce a difference in value between the actual ground reaction force and the target ground reaction force.

In some exemplary aspects, determining the target ground reaction force includes receiving a selection of an adjustable value for the target ground reaction force.

In some exemplary aspects, the method includes receiving a selection of an adjustment value for the target ground reaction force, and setting the target ground reaction force based on the predetermined target ground reaction force and the adjustment value.

In some exemplary aspects, the actuator includes a hydraulic actuator, and operating the actuator to reduce a difference in value between the actual ground reaction force and the target ground reaction force includes adjusting an operating pressure of the hydraulic actuator.

In some exemplary aspects, adjusting the operating pressure of the hydraulic actuator Includes changing an output pressure of a pressure reducing valve operatively connected to the hydraulic actuator.

In a further exemplary aspect, there is provided an agricultural vehicle, including a frame, a header movably mounted to the frame, an actuator configured to move the header relative to the frame, a load sensor mounted between at least one of one or more support members extending between the header and a ground surface, the load sensor configured to generate an output signal representative of a ground force sensed by the load sensor, and a control system operatively connected to the actuator and the load sensor. The control system is configured to determine an initial zero value sensor output signal representative of a position of the header or a portion thereof initially raised out of contact with the ground surface, calibrate the load sensor with the initial zero value sensor output signal, detect a subsequent position of the header or the portion thereof out of contact with the ground surface, determine a subsequent zero value sensor output signal representative of the subsequent position of the header or a portion thereof raised out of contact with the ground surface, and re-calibrate the load sensor with the subsequent zero value sensor signal.

In some exemplary aspects, the control system is configured to compare the initial zero value sensor output signal to the subsequent zero value sensor output signal, and, only upon determining that the subsequent zero value sensor signal differs from the initial zero value sensor signal by a predetermined amount, to re-calibrate the load sensor with the subsequent zero value sensor output signal. In some exemplary aspects, the control system is configured to re-calibrate the load sensor with the subsequent zero value sensor output signal automatically upon determining the subsequent zero value sensor output signal.

In some exemplary aspects, the load sensor comprises a load cell configured to generate a voltage or current proportional to the ground force sensed by the load sensor. In some exemplary aspects, the load cell comprises a strain gauge or a piezoelectric gauge. In some exemplary aspects, the load sensor comprises a spring that deflects due to a ground reaction force.

In some exemplary aspects, the one or more support members each comprise a skid shoe pivotally mounted to the header.

In some exemplary aspects, the actuator comprises a hydraulic actuator, and the control system is configured to operate the hydraulic actuator by adjusting an operating pressure of the hydraulic actuator.

In some exemplary aspects, the control system is operatively connected to a pressure reducing valve that is configured to adjust the operating pressure of the hydraulic actuator.

In some exemplary aspects, the header includes a wing of a segmented header, and the frame includes a center section of the segmented header; or the header includes a windrower header, and the frame includes a chassis of the agricultural vehicle; or the header includes a subframe of a header, and the frame includes a main frame of the header.

In some exemplary aspects, the load sensor is mounted between the header and at least one of one or more support members that extend between the header and the ground surface and that are configured to contact the ground surface.

In some exemplary aspects, the load sensor is configured to measure a difference in a total ground contact force for the agricultural vehicle between a header position out of contact with the ground surface and a header position in contact with the ground surface.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Embodiments described herein provide pressure sensing systems for determining ground reaction force between a header component and the underlying ground during operation of the header. Embodiments are shown in use with combine and windrower headers, but other embodiments may be used with other mechanisms that are contact the ground.

The terms "crop" and "crop material" are used to describe any mixture of grain, seeds, straw, tailings, and the like. "Grain" or "seeds" refer to that part of the crop material which is threshed and separated from the discardable part of the crop material (e.g., straw and tailings), and includes grain in aggregate form such as an ear of corn. The portion of the crop material that generally is discarded or not used for food or growing purposes may be referred to as non-grain crop material, material other than grain (MOG), or straw.

Also the terms "forward," "rearward," "left," and "right", when used in connection with the agricultural harvester (e.g. combine) and/or components thereof are usually determined with reference to the direction of forward operative travel of the combine, but again, they should not be construed as limiting. The terms "longitudinal" and "transverse" are determined with reference to the fore-and-aft direction of the agricultural combine and are equally not to be construed as limiting.

Figure 1:
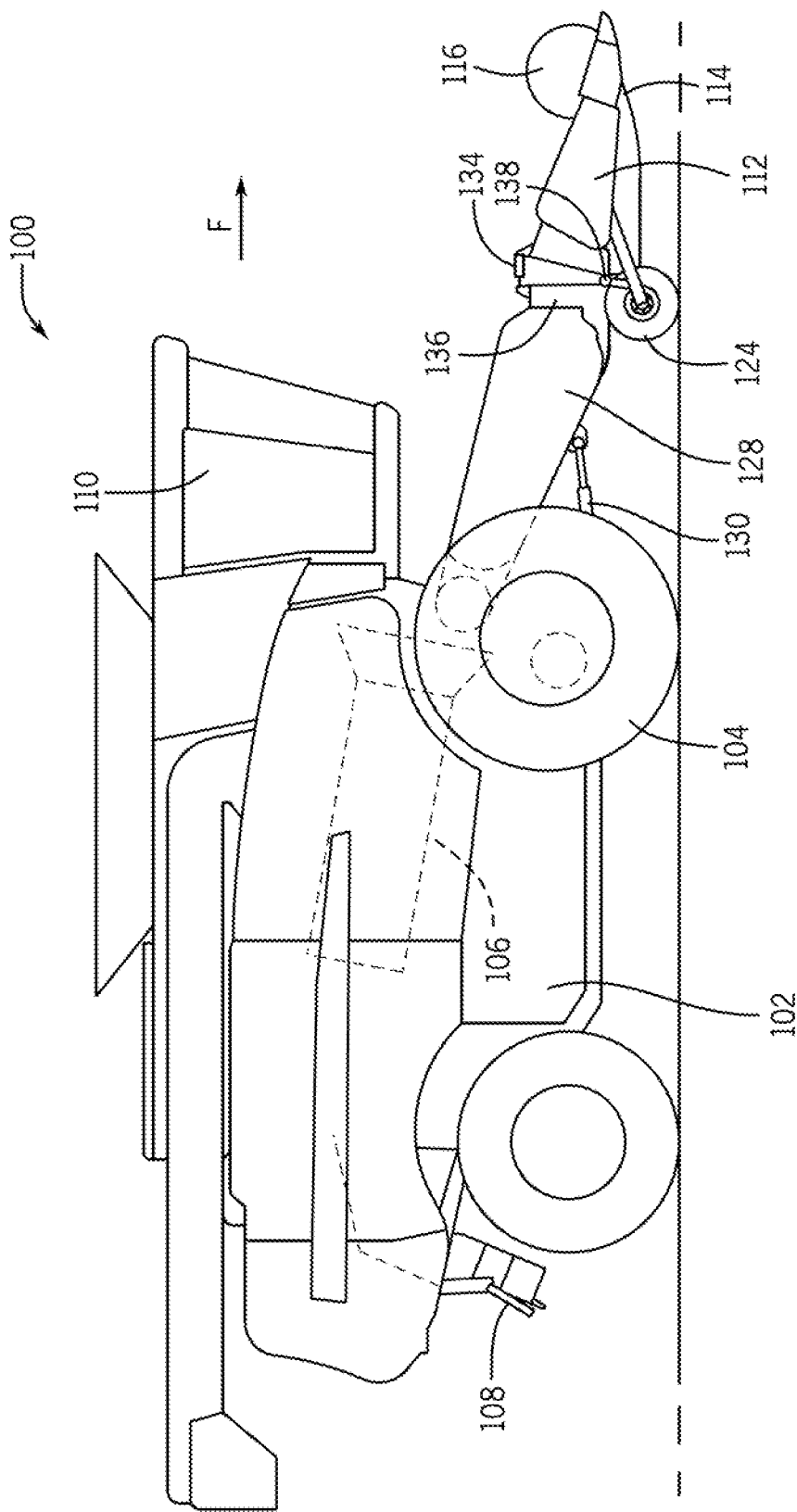
FIG. 1 is a side view of an agricultural combine for use with a header float control system.

FIG. 1 illustrates an example of an agricultural combine 100, with which embodiments of the invention may be used. The combine 100 includes a chassis 102 that is configured for driving on a surface (e.g., the ground or a road), such as by being supported by pneumatic wheels 104, tracked wheel assemblies, or the like. The combine 100 includes a threshing and separating system 106 mounted on or within the chassis 102. The threshing and separating system 106 may include mechanisms such as one or more threshers (e.g., an axial flow thresher), sieves, blowers, and the like, as well as an associated grain hopper and unloader. Threshing and separating systems 106 and their associated components are well known in the art, and need not be described in detail herein. The combine 100 also may include other features, such as a spreader 108, operator cab 110, and the like.

Figure 2:
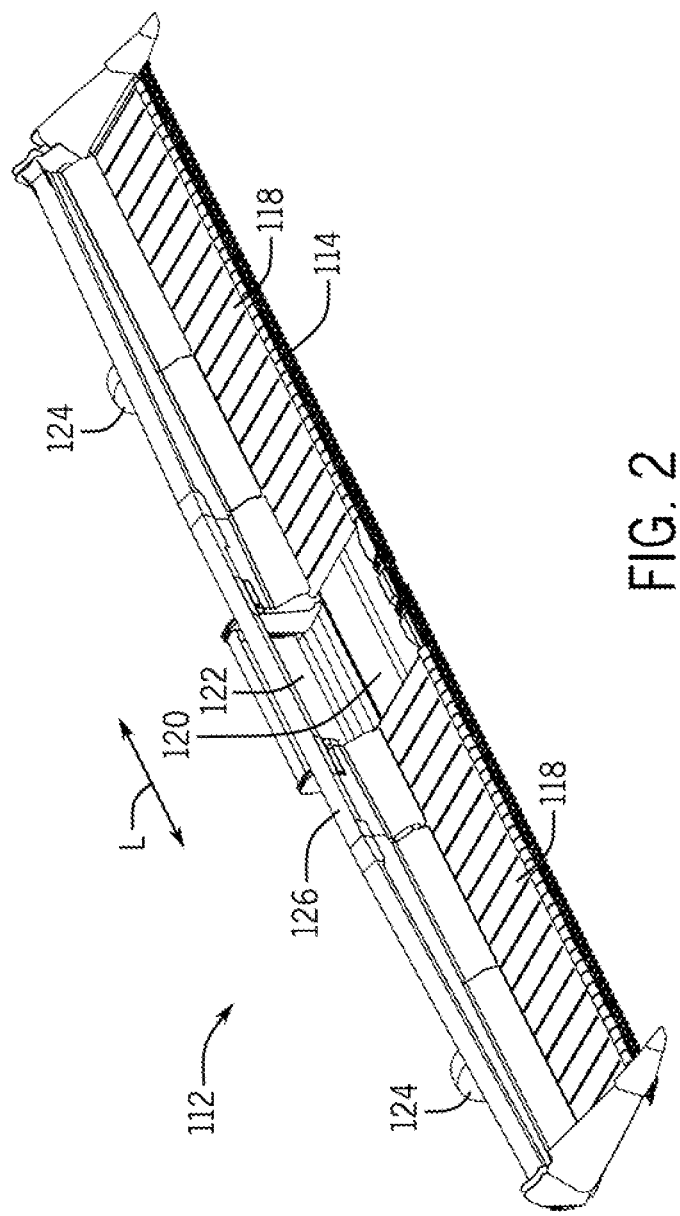
FIG. 2 is an isometric view of an exemplary header.
Figure 3:
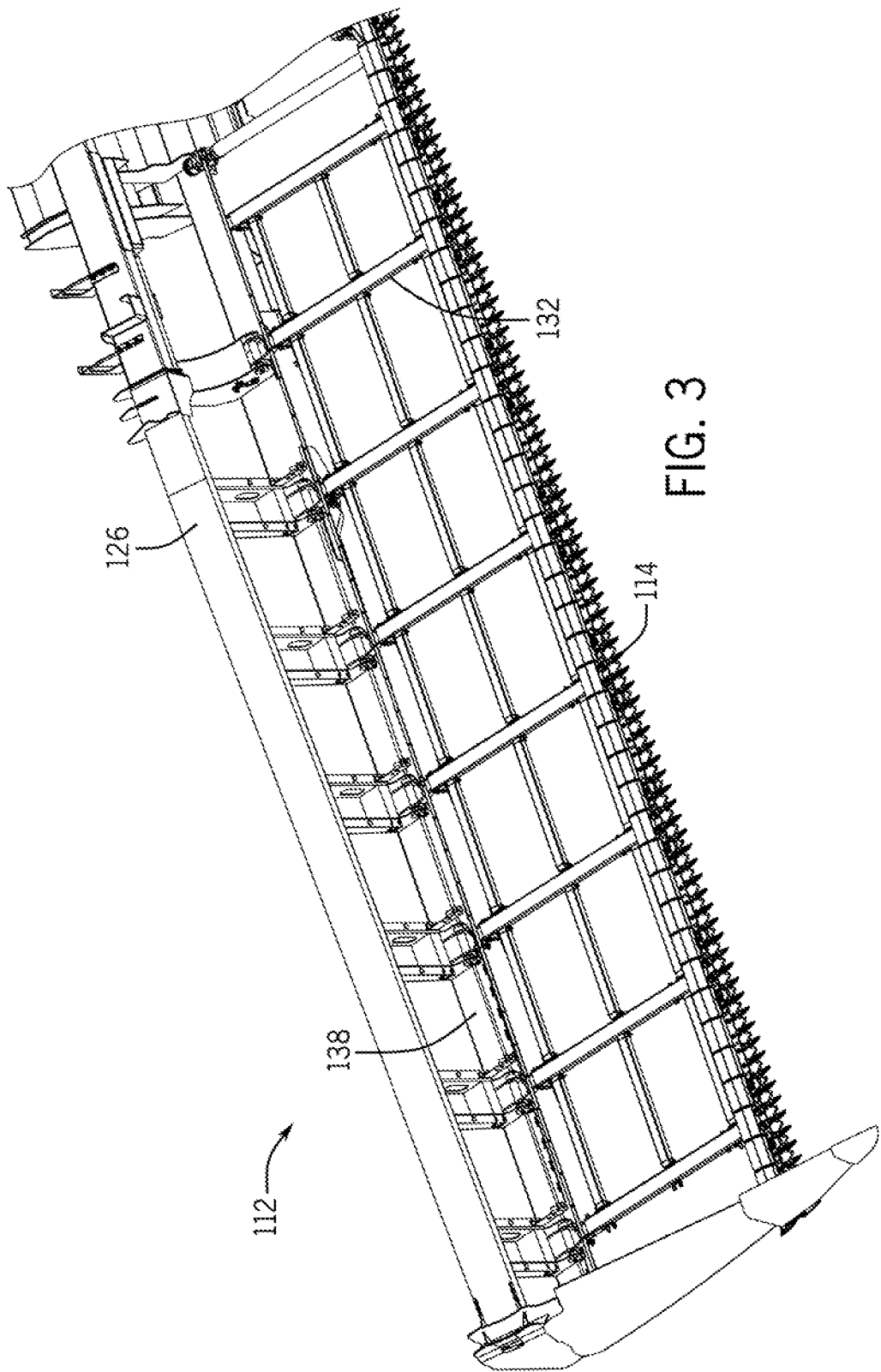
FIG. 3 is an isometric view of a portion of a header frame.

Referring also to FIGS. 2 and 3, the combine 100 also includes a header 112, which is configured to cut and harvest crop material from the ground as the combine 100 drives in the forward direction F. For example, the header 112 may include one or more cutter bars 114 located at or near the leading edge of the header 112 to cut crops at or near the ground level, and one or more reels 116 configured to pull the crop material backwards towards the header 112. The header 112 also may include crop conveyors 118 that are configured to move the crop material at the lateral ends of the header 112 towards the center of the header 112. The crop conveyors 118 may be in the form of belts, auger screws, or the like. At the center, the header 112 may include a feeder conveyor 120 that conveys the crop material backwards towards a crop outlet 122. The header 112 also may include gauge wheels 124 or skids to control the height of the header 112 over the ground.

The header 112 is built on a frame 126, which is attached to the chassis 102 of the combine 100 by a feeder housing 128. The feeder housing 128 is configured to convey crop material backwards from the header 112 to the threshing and separating system 106. The feeder housing 128 may be movable by one or more feeder housing actuators 130 to raise and lower the header 112 relative to the ground.

The header 112 also includes a number of support members 132 that extend forward from the frame 126 to hold parts such as the cutter bar 114, conveyors 118, or the like. The support members 132 may be rigidly attached to the header 112, or attached by movable mounts, such as pivots or linkages. In the case of movable support members 132, a suspension may be used to control the motion of the support members 132. For example, each support member 132 may have its own spring and/or damper system 138, which is intended to allow the support members 132 to move up and down individually or in groups to follow local undulations along the lateral direction L. Skids, gauge wheels, or other ground supports may be located below the support members 132 to generate a lifting force via contact with the ground. The positions of the ground supports and the spring and damping properties of the movable connections may be adjustable to tailor the header 112 for use in particular operating conditions. In addition, the positions of the support members 132, such as their angular orientation (downward tilt) relative to the frame 126 may be adjustable.

As noted above, the feeder housing may have actuators 130 to raise and lower the entire header 112. Additional position control may be provided by a tilt actuator 134 that controls the angle of the frame 126 relative to an anchor plate 136 mounted on the feeder housing 128. For example, the tilt actuator 134 may comprise a double-acting hydraulic actuator that is operated to pivot the frame 126 about a frame pivot axis.

Figure 4:
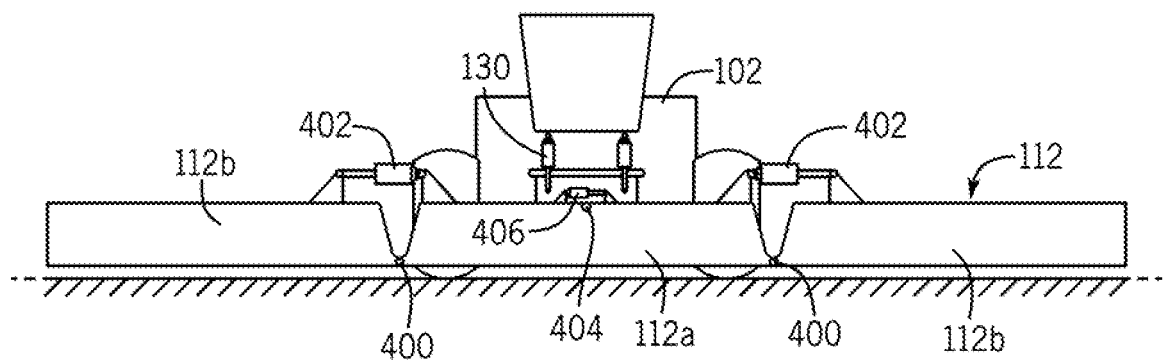
FIG. 4 is a schematic front view of an agricultural vehicle having a segmented header.

The exemplary header 112 in FIGS. 1-3 is a unitary header having a single frame 126 that extends continuously between the ends of the header 112 in the lateral direction L. In other embodiments, such as shown in FIG. 4, the header 112 may comprise a multi-segment or articulated header having a center section 112a and wing sections 112b movably attached to the lateral ends of the center section by pivots 400 or linkages, with actuators 402 configured control the heights of the wing sections 112b. The actuators 402 are separately or collectively controlled to maintain the ground reaction forces at a continuous or nearly continuous value. In this example, each wing section 112b is a header, and the frame is the center section 112a.

As also shown in FIG. 4, a header 112 (unitary or articulated) also may be attached to the chassis 102 by a longitudinal pivot 404 that allows the header 112 to tilt about a forward-extending horizontal axis to account for operation on pitched terrain, and an actuator 406 may be provided to control movement about the longitudinal pivot 404. The header 112 can be operated by one or more position control actuators 130, 134, 138, 402, 406 using measurements of reaction forces between the header 112 (or subassemblies thereof) and the ground.

Figure 5:
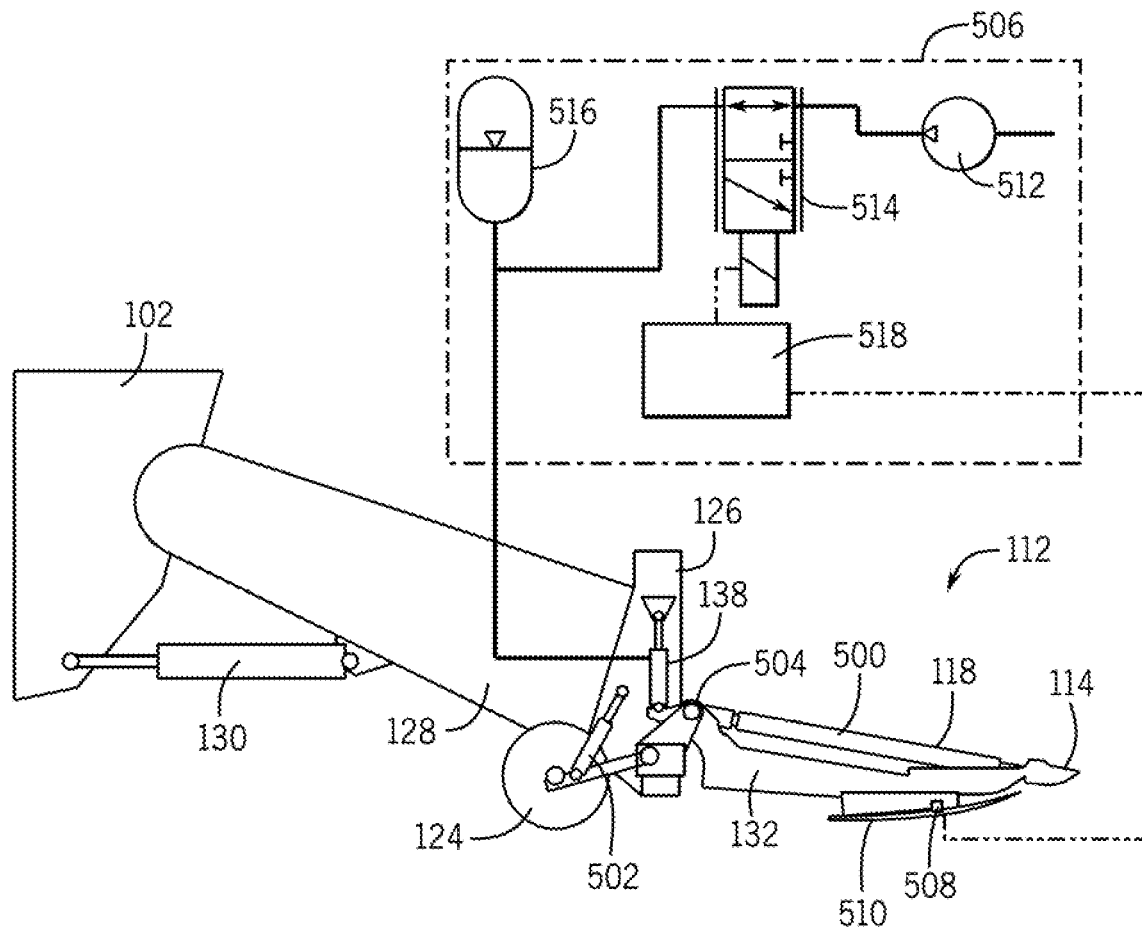
FIG. 5 is a schematic view of a header with a floating header subassembly, and an exemplary header float control system.

FIG. 5 illustrates an exemplary float control system that uses ground reaction force feedback to control one or more actuators that support the header 112. The exemplary header 112 has a frame 126 with forward-extending support members 132 that hold operating components such as cutter bars 114 and conveyor rollers 500 that support conveyors 118. This is a typical arrangement for a draper head having lateral belts 118 and an infeed belt 120, such as shown in FIG. 2. The support members 132 are suspended, at least in part, by one or more actuators 138, such as the shown hydraulic cylinders. The header 112 may be attached to the chassis 102 by a feeder housing 128 containing a feeder belt (not shown). The assembly also may include various additional suspension components for adjusting the position of the header 112 relative to the chassis 102 and/or ground. Such components may include, for example, a feeder housing actuator 130 to raise and lower the entire header 112, a gauge wheel actuator 502 to support the frame 126 on the ground, and other actuators such as discussed above.

The support members 132 are attached to the frame 126 by pivots 504 or other movable connections (e.g., linkages or telescoping connectors). During operation, the support members 132 are lowered into contact with the ground, and a hydraulic control system 506 is used to regulate the amount of force between the support members 132 and the ground. For simplicity, the example shows the control system 506 operating the support actuators 138 to regulate the ground force. It will be appreciated from the present disclosure, however, that other actuators, such as the gauge wheel actuators 502 and feeder housing actuator 130, can also have a bearing on the ground force between the support members 132 and the ground, and also may be part of the control system 506. It will also be appreciated that each support member 132 may have its own support actuator 138, or multiple support members 132 may share a single support actuator 138. Furthermore, the control system 506 may operate each support actuator 138 independently, operate multiple support actuators 138 as groups, or operate all of the support actuators 138 collectively. Other alternatives and variations will be apparent to persons of ordinary skill in the art in view of the present disclosure.

The control system 506 operates using feedback from one or more load sensors 508 that are operatively connected to skid shoes 510 mounted to the bottoms of one or more of the support members 132. Each support member 132 may have its own skid shoe 510 and load sensor 508, or some support members 132 may not include a load sensor 508, or some support members 132 may not have a load sensor 508 or a skid shoe 510. The load sensor 508 may be a load cell configured to generate a voltage or current proportional to the ground force sensed by the load sensor, such as a strain gauge, a piezoelectric gauge or a spring that deflects due to a ground reaction force. A variety of different configurations are possible, but it is believed that integrating the load sensors 508 between flexible skid shoes and a relatively static frame member provides a durable and reliable load sensing system. In an alternative embodiment (not shown), load sensors may be operatively connected to pneumatic wheels 104 or gauge wheels 124 or any other structure (e.g., tracks) supporting the vehicle 100 or header 112 when the header is raised off the ground, such load sensors being configured to measure a difference in a total ground contact force for the agricultural vehicle 100 or a portion thereof between a header position out of contact with the ground surface and a header position in contact with the ground surface.

The control system 506 may use any suitable configuration of electronic and/or hydraulic controls. In the shown example, the control system 506 receives pressurized hydraulic fluid from a pump 512 and directs the pressurized fluid through a hydraulic circuit to a one-way or two-way hydraulic actuator 138 that controls the position of the support member 132 relative to the header frame 126. The hydraulic circuit includes, for example, a pressure reducing valve 514 and an accumulator 516. An electronic control unit 518 (e.g., computer processor unit, circuit on a chip, a software module operating on an existing vehicle control system, or the like) is provided to receive output from the load sensors 508 and convert this into instructions to regulate the output of the pressure reducing valve 514 to thereby regulate ground force at the load sensors 508. Additional controls, such as a valve to control the fill level of the hydraulic actuator 138, check valves, drain valves, and so on, may be included in the hydraulic circuit, as known in the art.

The details of the control system operation are not relevant to the inventions described herein. Nevertheless, as one example, the electronic control unit 518 may have non-transient software instructions stored in a memory, and these instructions, when executed, measure the sensor output of the load sensors 508, compare these to a selected or predetermined threshold or target value, and increase or decrease the pressure output of the pressure reducing valve 514 to move the load sensor output values to remain within the threshold value or to move towards the target value. Other alternatives and variations will be apparent to persons of ordinary skill in the art in view of the present disclosure.

Figure 6:
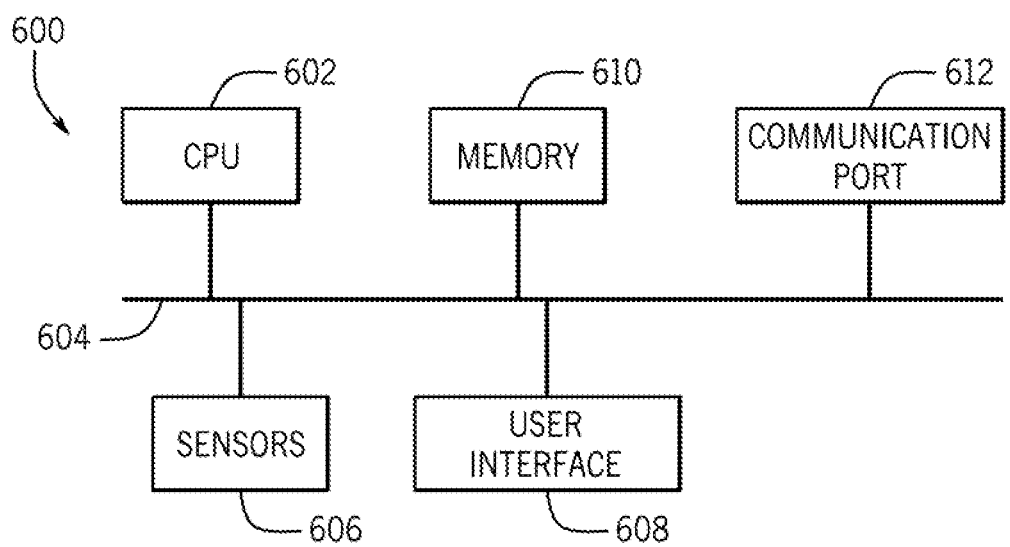
FIG. 6 is a schematic illustration of an exemplary header float control system.

FIG. 6 is a block diagram of exemplary hardware and computing equipment that may be used as a control system 600 to control the float characteristics of the header 112. The control system 600 includes a central processing unit (CPU) 602, which is responsible for performing calculations and logic operations required to execute one or more computer programs or operations. The CPU 602 is connected via a data transmission bus 604, to sensors 606 (e.g., load cells 508), a user interface 608, and a memory 610. The user interface 608 may comprise any suitable device for providing user input to or output from the control system 600, such as toggle switches, dials, digital switches, touchscreen displays, and the like. The control system 600 also has a communication port 612 that may be operatively connected (wired or wirelessly) an electrical terminal on the header (not shown). One or more analog to digital conversion circuits may be provided to convert analog data from the sensors 606 to an appropriate digital signal for processing by the CPU 602, and signal conditioning circuits may be used to filter or perform other functions on the raw data, as known in the art.

The CPU 602, data transmission bus 604 and memory 606 may comprise any suitable computing device, such as an INTEL ATOM E3826 1.46 GHz Dual Core CPU or the like, being coupled to DDR3L 1066/1333 MHz SO-DIMM Socket SDRAM having a 4 GB memory capacity or other non-transitory memory (e.g., compact disk, digital disk, solid state drive, flash memory, memory card, USB drive, optical disc storage, etc.). The CPU 402 also may comprise a circuit on a chip, microprocessor, or other suitable computing device. The selection of an appropriate processing system and memory is a matter of routine practice and need not be discussed in greater detail herein. The control system 600 may be integrated into an existing vehicle control system, added as a new component, or be a self-contained system.

It is to be understood that operational steps performed by the control system 600 may be performed by the controller upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller described herein is implemented in software code or instructions that are tangibly stored on a tangible computer readable medium. Upon loading and executing such software code or instructions by the controller, the controller may perform any of the functionality of the controller described herein, including any steps of the methods described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

Float performance and control of a header 112 can be controlled by using force measurements indicative of the actual weight of the header 112 on the ground (i.e., the ground reaction force). Such force measurements provide feedback in a form that can eliminate errors associated with hydraulic pressure sensors, and that can be used to accurately and automatically adjust for changing operating conditions, such as changes in header weight and oil temperature.

Automatic flotation pressure adjustment systems that rely on ground-contact force measurement require calibration. The control system 600 calibrates the load cells 508 by raising the header 112 out of contact with the ground. At this point, the load cells 508 can be set to a zero-load value. The inventors have determined that float performance of a header 112 can be enhanced by periodic and/or automatic recalibration of the header controller during operation of the header. This can be done when the header is temporarily raised during an end-of-row turn or any other time where the header is raised above the ground, such as during a manual raise.

Figure 7:
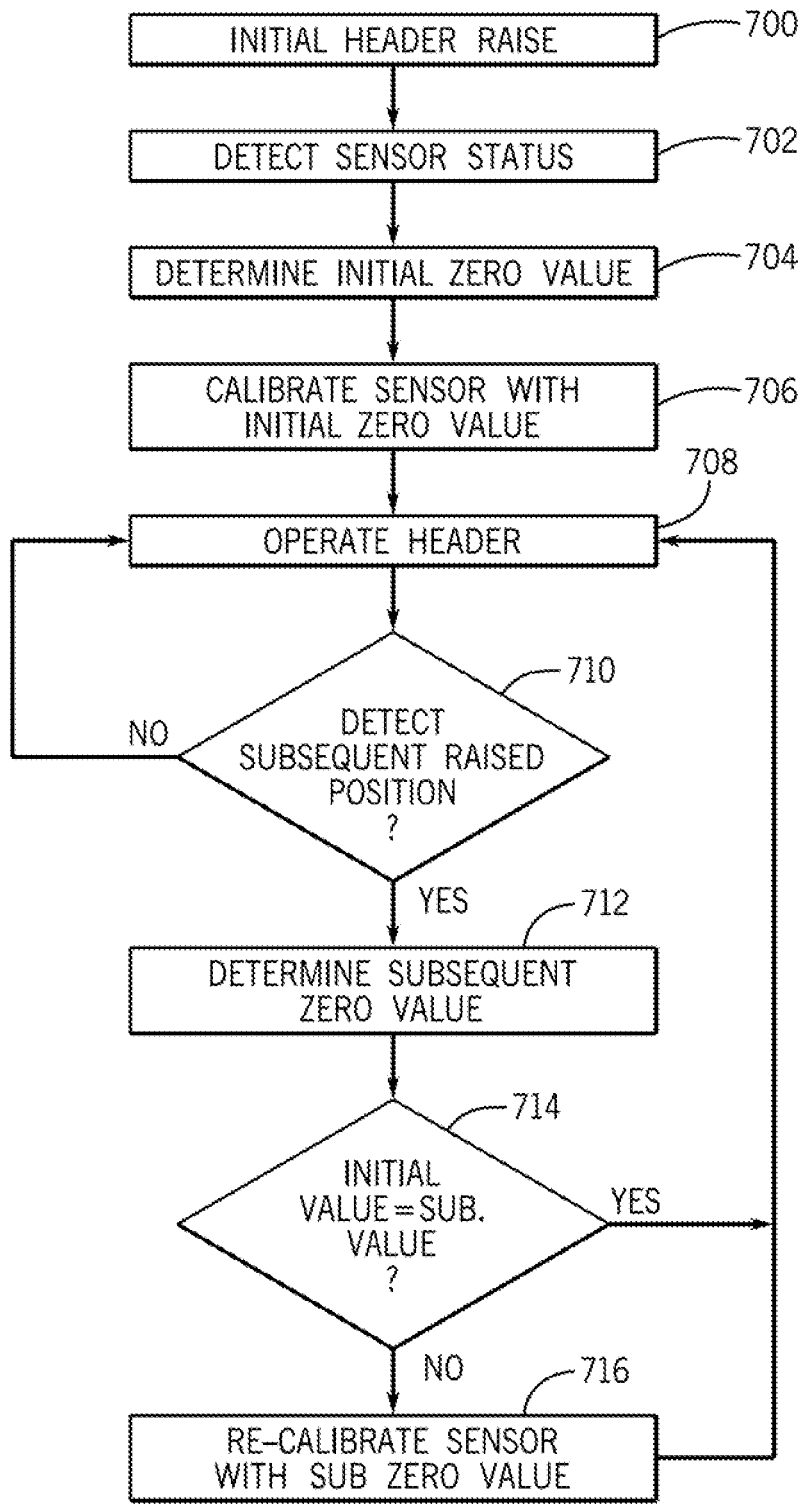
FIG. 7 is a flow chart illustrating an exemplary method for operating a header float control system.

FIG. 7 illustrates an exemplary method for operating a header control system 600 to automatically or periodically re-calibrate the automatic flotation pressure adjustment system. The exemplary method has five main parts: determining an initial zero value load sensor output signal representative of an initial position of the header or a portion thereof raised out of contact with the ground surface; calibrating the load sensor with the initial zero value sensor output signal; determining a subsequent zero value sensor output signal representative of a subsequent position of the header or the portion thereof raised out of contact with the ground surface; comparing the initial zero value sensor output signal to the subsequent zero value sensor output signal; and, upon determining that the subsequent zero value sensor signal differs from the initial zero value sensor signal, re-calibrating the load sensor with the subsequent zero value sensor output signal.

The zero value sensor output signal is the output signal of the load cell 508 when the header 112 or a portion thereof is raised out of contact with the ground. In an alternative embodiment, in determining the zero value output signal, the header 112 or a portion thereof is raised above a maximum header operating height, e.g., above the height at which the header 112 can or is operated to process a crop material, to ensure that the header or the portion thereof is out of contact with the ground surface. The zero value sensor output signal may be a single value representing the total header, or it may be divided into target signals at multiple locations or combinations of locations along the header. Dividing the zero value sensor output signals into multiple forces at different locations may have the benefit of helping to ensure that the calibrations of sensors at different, independently controllable locations on the header 112 more accurately reflect the conditions affecting sensor output signals at each location. Dividing the zero value sensor output signal into multiple signals also can be used to perform separate control feedback loops and calibrations at different actuators associated with different load cells 508. The zero value sensor output signal also may vary depending on the particular load cell 508, such as when certain components and their associated load cells 508 are desired to carry more or less weight or absorb more or less ground force. The zero value sensor output signal also may be selected based on other factors, such as the position of the header or header subassembly relative to the vehicle chassis 102 or the rest of the header. Other alternatives and variations will be apparent to persons of ordinary skill in the art in view of the present disclosure.

Referring again to FIG. 7, at step 700 of the shown example, header 112 or a portion thereof is raised initially by the operator to a position out of contact with the ground surface and, optionally, above a maximum working height, e.g., above the height at which the header 112 can or is operated to process a crop material. At step 702, the control system 600 first detects the status of a load sensor 508 mounted between the header 112 at least one of one or more support members 132 extending between the header 112 and the ground surface via a header electrical terminal or other communication path (e.g., hard-wired or wireless, not shown) with the header 112. Load sensor 508 is configured to generate an output signal to control system 600 that is representative of the ground force sensed by the load sensor 508. At step 704, the control system 600 determines and stores, as the initial zero value sensor output signal, the output signal of the load sensor 508 when the header 112 is raised initially by the operator in step 700 to a position out of contact with the ground surface and, optionally, above a maximum working height. At step 706, control system 600 initially calibrates load cell 508 using the initial zero value sensor output determined and stored in step 704. Following initial calibration of sensor 508 in step 706, header 112 is operated to process a crop material in step 708.

Control system 600 is configured to detect in step 710 when, subsequent to operation being initiated in step 708, header 112 or a portion thereof is raised to a position out of contact with the ground. This can be done when the header 112 or a portion thereof is temporarily raised during an end-of-row turn or any other time where the header is raised above the ground, such as during an operator-initiated manual raise. If controller 600 detects after operation begins in step 708 that header 112 or a portion thereof has been raised out of contact with the ground surface, controller 600 will receive and store a subsequent zero value sensor output signal representative of the position of the header or the portion thereof raised out of contact with the ground surface detected in step 710.

In step 714, the control system 600 compares the initial zero value sensor output signal to the subsequent zero value sensor output signal, and determines whether they are within a predetermined amount of deviation—i.e., "equal." It will be appreciated that the predetermined amount of deviation may be selected based on various factors, such as sensor accuracy, control system operating performance, and the like. For example, if a deviation of a certain amount of signal is deemed insignificant, then the predetermined amount may be set as this amount of signal, thus leading to adjustments being made only when the deviation is considered significant. Alternatively, the control system 600 may be programmed to consider any detectable difference in signal to be above the predetermined amount of deviation, in which case the predetermined amount is equal to the smallest unit of measurement. Also, a default deviation may be programmed into the system, with subsequent user adjustment being possible (e.g., by raising or lowering the deviation threshold value before a change in operating state is initiated).

If it is determined in step 714 that the values are equal (i.e., within the predetermined amount), then the control loop returns to step 708. If the values are not equal, then the control loop proceeds to step 716, in which the control system 600 re-calibrates the sensor 508 with the subsequent zero value sensor output signal. Following re-calibration of sensor 508 in step 716, the control loop returns to operation of header 112 in step 708. Any suitable control algorithm may be used, such as proportional control, proportional-integral-derivative ("PID") control, or the like.

In an alternative embodiment (not shown), step 714 may be omitted, and the control system 600 re-calibrates the load sensor with the subsequent zero value sensor output signal automatically upon determining the subsequent zero value sensor output signal.

Figure 8:
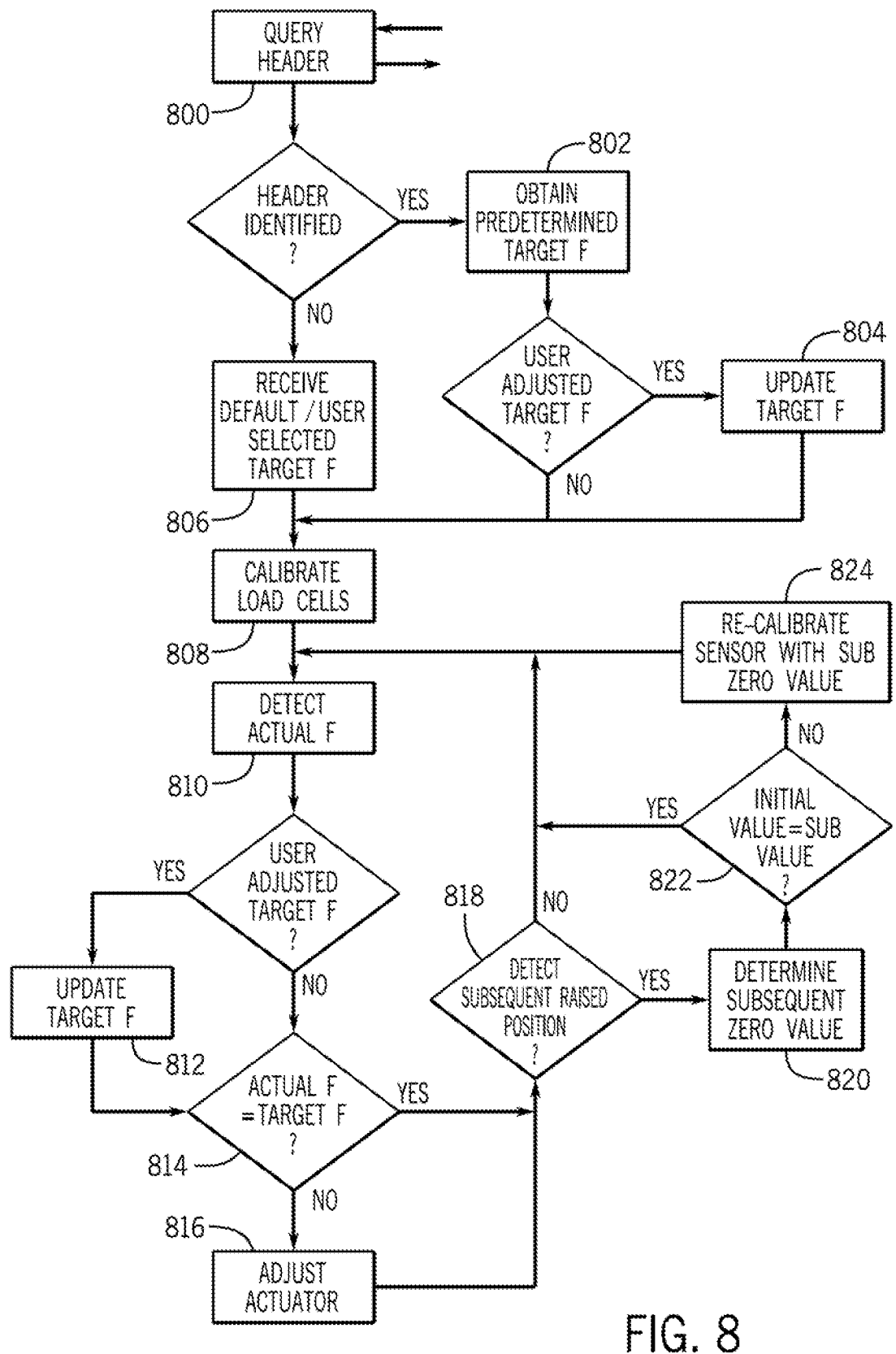
FIG. 8 is a flow chart illustrating a further exemplary method for operating a header float control system.

FIG. 8 illustrates a further exemplary method for operating a header control system 600 to adjust the float characteristics of a header 112 based on measurements obtained by the load cells 508. The method includes: identifying a target ground reaction force, comparing the actual ground reaction force with the target ground reaction force, and adjusting one or more operating parameters of the actuator system to reduce a difference between the target ground reaction force and the actual ground reaction force.

The target ground reaction force is the desired amount of force exerted between the header 112 (or the suspended portion, such as a wing section or subassembly, of the header) and the ground. This value may be a single value representing the total header weight (e.g., a total of x pounds force among all of the load cells 508), or it may be divided into target ground reaction forces at multiple locations along the header (e.g., x/2 pounds force at each of two load cells 508). Dividing the target value into multiple forces at different locations may have the benefit of helping to ensure that the weight of the header 108 is not concentrated at a single location. Dividing the target value into multiple forces also can be used to perform separate control feedback loops at different actuators associated with different load cells 508. The target ground reaction force also may vary depending on the particular load cell 508, such as when certain components and their associated load cells 508 are desired to carry more or less weight. The target ground reaction force also may be selected based on other factors, such as the position of the header or header subassembly relative to the vehicle chassis 102 or the rest of the header. For example, the target ground force might vary depending on the position of flex arms holding operating components (e.g., higher force allowed or desired at higher vertical elevations, or vice-versa). Such values can be set according to predetermined equations or using lookup tables, or modified by manual user adjustment. Other alternatives and variations will be apparent to persons of ordinary skill in the art in view of the present disclosure.

Identifying the target ground reaction force can be accomplished in various ways. At step 800 of the shown example, the control system 600 first attempts to detect and identify the header 112 by querying the header electronics via the header's electrical terminal or other communication path (e.g., hard-wired or wireless, not shown) with the header 112. Such query may comprise a signal sent to the header 112 to determine properties of the header (e.g., a particular number and/or type of load cells 508 indicative of a distinct type of header), or a signal sent to a processor or circuit in the header 112 that is configured to return a header identification code or signal. The query also may be sent to other operating systems of the vehicle 100, which may be programmed to have the identity of the header 112. The identity of the header 112 may be, for example, an indicator of a particular class of headers (e.g., windrower headers), type of header (e.g., windrower headers with a particular blade arrangement), or it may be a unique identifier of an individual header. The identity of the header also may indicate other variables, such as the particular size or width of the header. This may be useful to determine how many load cells 508 will be part of the control system, knowing an area over which the load is distributed for determining average ground pressure, and so on.

In step 802, if the control system 600 is able to identify the header 112, it then obtains a predetermined target ground reaction force that is associated with the particular type of header 112. For example, the header's manufacturer may recommend operating a header having a particular construction at a certain default target ground reaction force. Upon identifying that the header is one of that particular type, the control system 600 can then automatically set the target ground reaction force as the predetermined target ground force value.

The control system 600 also may be configured to allow the operator to adjust the predetermined target ground reaction force, based on operating conditions or other factors. Thus, in step 804 the control system 600 can update the target ground reaction force if an operator adjustment is received (e.g., add or subtract a user-selected adjustment amount value, or replace the total value with the user-selected total value).

If the control system 600 is not able to identify the header 112, then the control system 600 uses a default value, or receives a user-selected adjustable value of the target ground reaction force from the user interface 608 (step 806).

In step 808, the control system 600 calibrates the load cells 508 by raising the header 112 out of contact with the ground. At this point, the load cells 508 are set to a zero-load value. The calibration step 808 also may be used to guide the operator to select a target ground reaction force, if no value is already selected. For example, when the operator moves the header 112 to contact the ground after calibration, the control system 600 may use the resting force at the end of the operator's lowering process as the target ground reaction force.

Beginning at step 810, the control system 600 performs a control loop during operation of the header 112 on the ground. At step 810, the control system 600 obtains output signals from the load cells 508 to determine the actual ground reaction force (either collectively, or as a function of particular load cells 508 or groups of load cells 508). The raw data from the load cells 508 may be processed in a variety of ways to remove noise, account for transient loads caused during operation, remove contributions caused by regular vibrations (e.g., cyclical vibrations caused by the cutters), smooth the data, and so on. The control system 600 also preferably includes, during the control loop, a step of determining whether the operator has adjusted the desired ground force target value and updating the ground force target value accordingly (step 812).

In step 814, the control system 600 compares the actual ground reaction force with the target ground reaction force, and determines whether they are within a predetermined amount of deviation—i.e., "equal." It will be appreciated that the predetermined amount of deviation may be selected based on various factors, such as sensor accuracy, control system operating performance, and the like. For example, if a deviation of a certain amount of force is deemed insignificant, then the predetermined amount may be set as this amount of force, thus leading to adjustments being made only when the deviation is considered significant. Alternatively, the control system 600 may be programmed to consider any detectable difference in force to be above the predetermined amount of deviation, in which case the predetermined amount is equal to the smallest unit of measurement. Also, a default deviation (e.g., 50 pounds) may be programmed into the system, with subsequent user adjustment being possible (e.g., by raising or lowering the deviation threshold value before a change in operating state is initiated).

If it is determined in step 814 that the values are equal (i.e., within the predetermined amount), then the control loop returns to step 810. If the values are not equal, then the control loop proceeds to step 816, in which the control system 600 adjusts one or more operating parameters of the actuators 112 to reduce or eliminate the difference between the actual ground reaction force and the target ground reaction force. Any suitable control algorithm may be used, such as proportional control, proportional-integral-derivative ("PID") control, or the like.

Control system 600 is configured to detect in step 818 when, subsequent to operation being initiated in step 810, header 112 or a portion thereof is raised to a position out of contact with the ground n. This can be done when the header 112 or a portion thereof is temporarily raised during an end-of-row turn or any other time where the header is raised above the ground, such as during an operator-initiated manual raise. If controller 600 detects after operation begins in step 810 that header 112 or a portion thereof has been raised out of contact with the ground surface, controller 600 will receive and store a subsequent zero value sensor output signal representative of the position of the header or the portion thereof raised out of contact with the ground surface detected in step 818.

In step 822, the control system 600 compares the initial zero value sensor output signal to the subsequent zero value sensor output signal, and determines whether they are within a predetermined amount of deviation—i.e., "equal." It will be appreciated that the predetermined amount of deviation may be selected based on various factors, such as sensor accuracy, control system operating performance, and the like. For example, if a deviation of a certain amount of signal is deemed insignificant, then the predetermined amount may be set as this amount of signal, thus leading to adjustments being made only when the deviation is considered significant. Alternatively, the control system 600 may be programmed to consider any detectable difference in signal to be above the predetermined amount of deviation, in which case the predetermined amount is equal to the smallest unit of measurement. Also, a default deviation may be programmed into the system, with subsequent user adjustment being possible (e.g., by raising or lowering the deviation threshold value before a change in operating state is initiated).

If it is determined in step 822 that the values are equal (i.e., within the predetermined amount), then the control loop returns to step 810. If the values are not equal, then the control loop proceeds to step 824, in which the control system 600 re-calibrates the sensor 508 with the subsequent zero value sensor output signal. Following re-calibration of sensor 508 in step 824, the control loop returns to operation of header 112 in step 810. Any suitable control algorithm may be used, such as proportional control, proportional-integral-derivative ("PID") control, or the like.

In an alternative embodiment (not shown), step 822 may be omitted, and the control system 600 re-calibrates the load sensor with the subsequent zero value sensor output signal automatically upon determining the subsequent zero value sensor output signal.

It will be appreciated that the foregoing method may be modified in various ways, or replaced by a different control method. For example, the header control system 600 may be operated by setting a target maximum ground force, and controlling the actuators 112 to maintain the measured ground force below the maximum value. This may be helpful, for example, to avoid "bulldozing" the soil in certain ground conditions, and to prevent potentially damaging overloads. Such a control process may be added to the foregoing process, or used as a separate process. Other alternatives and variations will be apparent to persons of ordinary skill in the art in view of the present disclosure.

It will also be appreciated that the foregoing systems and methods for controlling a header using measured ground reaction force may be applied to different types of headers or other equipment. Thus, the terms "header" and "frame" are used generically to refer to a part (the header) that is movably attached to another part (the frame). Other alternatives and variations will be apparent to persons of ordinary skill in the art in view of the present disclosure.

The present disclosure describes a number of inventive features and/or combinations of features that may be used alone or in combination with each other or in combination with other technologies. The embodiments described herein are all exemplary and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A method for dynamically operating a header float system of an agricultural vehicle having a header movably mounted to a frame by an actuator and a flotation adjustment system that relies on ground-contact force measurement, the method comprising:
   initially raising the header or a portion thereof to a position out of contact with the ground surface;
   detecting a status of a load sensor, the load sensor configured to generate an output signal representative of a ground force sensed by the load sensor;
   determining an initial zero value sensor output signal representative of the position of the header or the portion thereof initially raised out of contact with the ground surface;
   calibrating the load sensor with the initial zero value sensor output signal;
   operating the header at a working height to process a crop material;
   detecting a subsequent position of the header or the portion thereof out of contact with the ground surface;
   determining a subsequent zero value sensor output signal representative of the subsequent position of the header or the portion thereof raised out of contact with the ground surface; and
   re-calibrating the load sensor with the subsequent zero value sensor output signal.

2. The method of claim 1, comprising:
   comparing the initial zero value sensor output signal to the subsequent zero value sensor output signal, and, upon determining that the subsequent zero value sensor signal differs from the initial zero value sensor signal by a predetermined amount, re-calibrating the load sensor with the subsequent zero value sensor output signal; or
   re-calibrating the load sensor with the subsequent zero value sensor output signal automatically upon determining the subsequent zero value sensor output signal.

3. The method of claim 1, wherein in determining the initial zero value sensor output signal representative of the position of the header or the portion thereof initially raised out of contact with the ground surface, the header or portion thereof is raised above a maximum working height.

4. The method of claim 1, further comprising:
   determining a target ground reaction force between the header and a ground surface located below the header;
   determining an actual ground reaction force between the header and the ground surface;
   comparing the actual ground reaction force to the target ground reaction force; and
   upon determining that the actual ground reaction force differs from the target ground reaction force by a predetermined amount, operating the actuator to reduce a difference in value between the actual ground reaction force and the target ground reaction force.

5. The method of claim 4, wherein determining the target ground reaction force comprises receiving a selection of an adjustable value for the target ground reaction force.

6. The method of claim 4, further comprising:
receiving a selection of an adjustment value for the target ground reaction force; and
setting the target ground reaction force based on the predetermined target ground reaction force and the adjustment value.

7. The method of claim 1, wherein the actuator comprises a hydraulic actuator, and operating the actuator to reduce a difference in value between the actual ground reaction force and the target ground reaction force comprises adjusting an operating pressure of the hydraulic actuator.

8. The method of claim 7, wherein adjusting the operating pressure of the hydraulic actuator comprises changing an output pressure of a pressure reducing valve operatively connected to the hydraulic actuator.

9. An agricultural vehicle comprising:
a frame;
a header movably mounted to the frame;
an actuator configured to move the header relative to the frame;
a load sensor, the load sensor configured to generate an output signal representative of a ground force sensed by the load sensor, and
a control system operatively connected to the actuator and the load sensor and configured to:
determine an initial zero value sensor output signal representative of a position of the header or a portion thereof initially raised out of contact with the ground surface;
calibrate the load sensor with the initial zero value sensor output signal;
detect a subsequent position of the header or the portion thereof out of contact with the ground surface;
determine a subsequent zero value sensor output signal representative of the subsequent position of the header or a portion thereof raised out of contact with the ground surface; and
re-calibrate the load sensor with the subsequent zero value sensor signal.

10. The agricultural vehicle of claim 9, wherein the control system is configured to:
compare the initial zero value sensor output signal to the subsequent zero value sensor output signal, and, upon determining that the subsequent zero value sensor signal differs from the initial zero value sensor signal by a predetermined amount, to re-calibrate the load sensor with the subsequent zero value sensor output signal; or
re-calibrate the load sensor with the subsequent zero value sensor output signal automatically upon determining the subsequent zero value sensor output signal.

11. The agricultural vehicle of claim 9, wherein the load sensor comprises a load cell configured to generate a voltage or current proportional to the ground force sensed by the load sensor.

12. The agricultural vehicle of claim 11, wherein the load cell comprises a strain gauge or a piezoelectric gauge.

13. The agricultural vehicle of claim 9, wherein the load sensor comprises a spring that deflects due to a ground reaction force.

14. The agricultural vehicle of claim 9, wherein the one or more support members each comprise a skid shoe pivotally mounted to the header.

15. The agricultural vehicle of claim 9, wherein the actuator comprises a hydraulic actuator, and the control system is configured to operate the hydraulic actuator by adjusting an operating pressure of the hydraulic actuator.

16. The agricultural vehicle of claim 15, wherein the control system is operatively connected to a pressure reducing valve that is configured to adjust the operating pressure of the hydraulic actuator.

17. The agricultural vehicle of claim 9, wherein:
the header comprises a wing of a segmented header, and the frame comprises a center section of the segmented header; or
the header comprises a windrower header, and the frame comprises a chassis of the agricultural vehicle; or
the header comprises a subframe of a header, and the frame comprises a main frame of the header.

18. The agricultural vehicle of claim 9, wherein the load sensor is mounted between the header and at least one of one or more support members that extend between the header and the ground surface and that are configured to contact the ground surface.

19. The agricultural vehicle of claim 9, wherein the load sensor is configured to measure a difference in a total ground contact force for the agricultural vehicle between a header position out of contact with the ground surface and a header position in contact with the ground surface.

* * * * *